(12) United States Patent
Shaw et al.

(10) Patent No.: US 9,353,663 B2
(45) Date of Patent: May 31, 2016

(54) LIQUID INTRUSION SEALING STRUCTURE OF A UREA INJECTOR

(71) Applicant: Continental Automotive Systems, Inc., Auburn Hills, MI (US)

(72) Inventors: Keith Aaron Shaw, Yorktown, VA (US); Robert Wayne McFarland, Newport News, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 216 days.

(21) Appl. No.: 14/072,822

(22) Filed: Nov. 6, 2013

(65) Prior Publication Data

US 2015/0122917 A1 May 7, 2015

(51) Int. Cl.
| | | |
|---|---|---|
| *B05B 1/30* | (2006.01) | |
| *F01N 3/20* | (2006.01) | |
| *F16L 21/035* | (2006.01) | |
| *F01N 13/18* | (2010.01) | |

(52) U.S. Cl.
CPC .......... *F01N 3/2066* (2013.01); *F01N 13/1827* (2013.01); *F16L 21/035* (2013.01); *F01N 2610/02* (2013.01); *F01N 2610/14* (2013.01); *F01N 2610/1453* (2013.01); *Y02T 10/24* (2013.01)

(58) Field of Classification Search
CPC .......... F02M 63/0005; F02M 37/0023; F02M 63/007; F02M 21/0242; F02M 21/0293; F02M 61/14

USPC .................... 239/533.2, 533.11, 585.3, 585.5
See application file for complete search history.

(56) References Cited

U.S. PATENT DOCUMENTS

| | | | |
|---|---|---|---|
| 7,107,969 B2 | 9/2006 | Norcutt et al. | |
| 7,175,105 B2 | 2/2007 | Plecher et al. | |
| 7,398,767 B2 | 7/2008 | Kondo et al. | |
| 2013/0233279 A1* | 9/2013 | Karay ........................... | 123/470 |

FOREIGN PATENT DOCUMENTS

| | | |
|---|---|---|
| DE | 102004021117 A1 | 12/2004 |
| DE | 102005046399 A1 | 4/2006 |
| DE | 102006000389 A1 | 2/2007 |
| EP | 1628016 B1 | 4/2008 |
| GB | 2428742 B | 10/2010 |

* cited by examiner

*Primary Examiner* — Davis Hwu

(57) ABSTRACT

A fluid injector includes a body associated with an outlet of the injector. An inlet tube is coupled to the body and has an open end for receiving fluid to be injected. An inlet cup has an open end and covers the open end of the inlet tube and also covers a portion of the body. The injector includes sealing structure including a primary seal providing a seal between the inlet cup and the inlet tube, a secondary seal between the body and the inlet cup and constructed and arranged to prevent liquid that is external to the injector from entering an interior of the injector through the open end of the inlet cup, and a surface feature on the body or on the inlet cup constructed and arranged to compress a portion of the secondary seal between the inlet cup and the body.

19 Claims, 6 Drawing Sheets

LIQUID INTRUSION SEALING STRUCTURE OF A UREA INJECTOR

FIELD

The invention relates to a urea injector of a reductant delivery unit (RDU) that supplies reducing agent to an engine exhaust system and, more particularly, to sealing structure of the injector that eliminates external water intrusion into the interior of the injector.

BACKGROUND

The advent of a new round of stringent emissions legislation in Europe and North America is driving the implementation of new exhaust after-treatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide (NOx) emissions that are difficult to treat in oxygen-rich exhaust environments characteristic of lean-burn combustion. Exhaust after-treatment technologies are currently being developed that will treat NOx under these conditions. One of these technologies comprises a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR).

Ammonia is difficult to handle in its pure form in the automotive environment. Therefore, it is customary with these systems to use a liquid aqueous urea solution, typically at a 32% concentration of urea solution ($CO\,(NH_2)_2$). The solution is referred to as AUS-32, and is also known under its commercial name of AdBlue. The urea solution is delivered to the hot exhaust stream by an injector and the urea solution is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide (CO2). The ammonia resulting from the thermolysis and the hydrolysis then undergoes a catalyzed reaction with the nitrogen oxides as described previously.

A conventional urea injector is shown generally indicated at 10 in FIG. 1. The injector 10 includes an inlet connector 12 defining an inlet 14 of the injector. An inlet cup 16 is coupled to the inlet connector 12. An inlet tube 17 is coupled to a body 24 of the injector 10 and delivers urea solution to a solenoid 18 that is housed in the body 24. The electrically operated solenoid 18 controls the amount of urea solution delivered from an outlet 20 of the injector and into the exhaust gas flow path of a vehicle in a dosing application. The solenoid 18 can be of the type disclosed in U.S. Pat. No. 6,685,112, the content of which is hereby incorporated by reference into this specification. As best shown in FIG. 2, a conventional elastomeric O-ring seal 22 of round cross-section is provided between the inlet cup 16 and inlet tube 17 of the injector 10. Normal urea solution flow through the injection 10 is shown by the vertical arrow A directed downwardly.

In the conventional injector 10, improper sealing can occur between the seal 22 and the body 24, which can result in the intrusion of water or other liquids (shown by arrows B in FIG. 2) into the interior of the injector 10. Any conductive liquid such as salt water is known to cause bridging of electrical paths and subsequent injector failure. This is particularly troublesome on a urea injector which is mounted underbody and is exposed to a harsher environment than a gasoline injector. Continuous wetting from rain or melted snow is likely. Salts used to melt ice in northern climates create a very conductive liquid due to the ionic nature of sodium chloride.

Thus, there is a need in a urea injector to provide improved sealing structure to prevent the intrusion of external liquid into an interior of the injector.

SUMMARY

An object of the invention is to fulfill the needs referred to above. In accordance with the principles of an embodiment, this objective is obtained by a fluid injector that includes a body associated with an outlet of the injector. An inlet tube is coupled to the body and has an open end for receiving fluid to be injected. An inlet cup has an open end and covers the open end of the inlet tube and also covers a portion of the body. The injector includes sealing structure including a primary seal providing a seal between the inlet cup and the inlet tube, a secondary seal between the body and the inlet cup and constructed and arranged to prevent liquid that is external to the injector from entering an interior of the injector through the open end of the inlet cup, and a surface feature on the body or on the inlet cup constructed and arranged to compress a portion of the secondary seal between the inlet cup and the body.

In accordance with another aspect of an embodiment, a method prevents liquid, external to an injector, from entering the injector. The injector includes a body associated with an outlet of the injector. An inlet tube is coupled to the body and has an open end for receiving fluid to be injected. An inlet cup has an open end and covers the open end of the inlet tube and also covers a portion of the body. The method provides a primary seal between the inlet cup and the inlet tube and a secondary seal between the body and the inlet cup. At least a portion of the secondary seal is compressed between the body and the inlet cup to prevent the external liquid from entering an interior of the injector through the open end of the inlet cup.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 3:
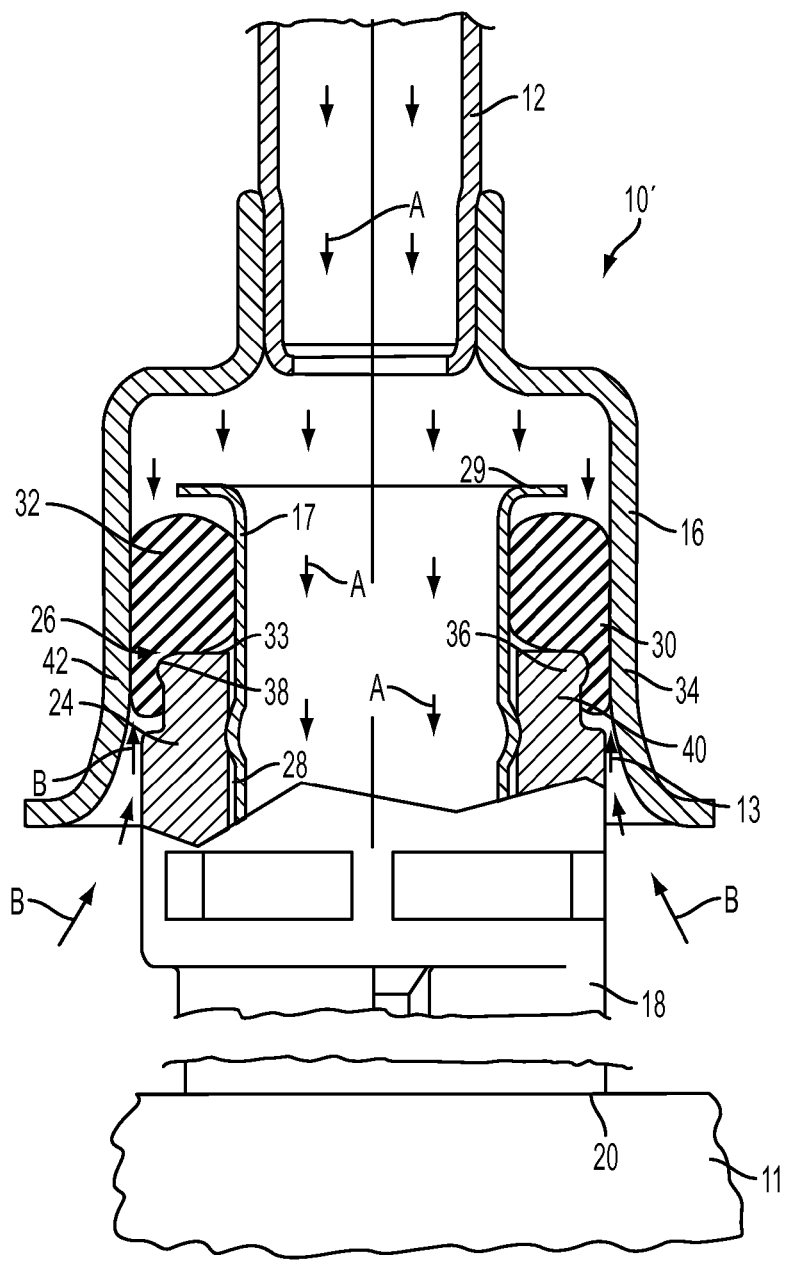
FIG. 3 is a view of sealing structure to prevent the intrusion of liquid between an inlet cup and a body of a urea injector, in accordance with an embodiment wherein a unitary seal member of the sealing structure has a primary and a secondary seal.

With reference to FIG. 3, a portion of a fluid injector 10' is shown in accordance with an embodiment mounted to an exhaust gas flow path 11 for delivering fluid, such as urea solution, thereto. The injector may be employed in a system of the type disclosed in U.S. Pat. No. 8,024,922, the contents of which are hereby incorporated by reference into this specification.

Figure 1:
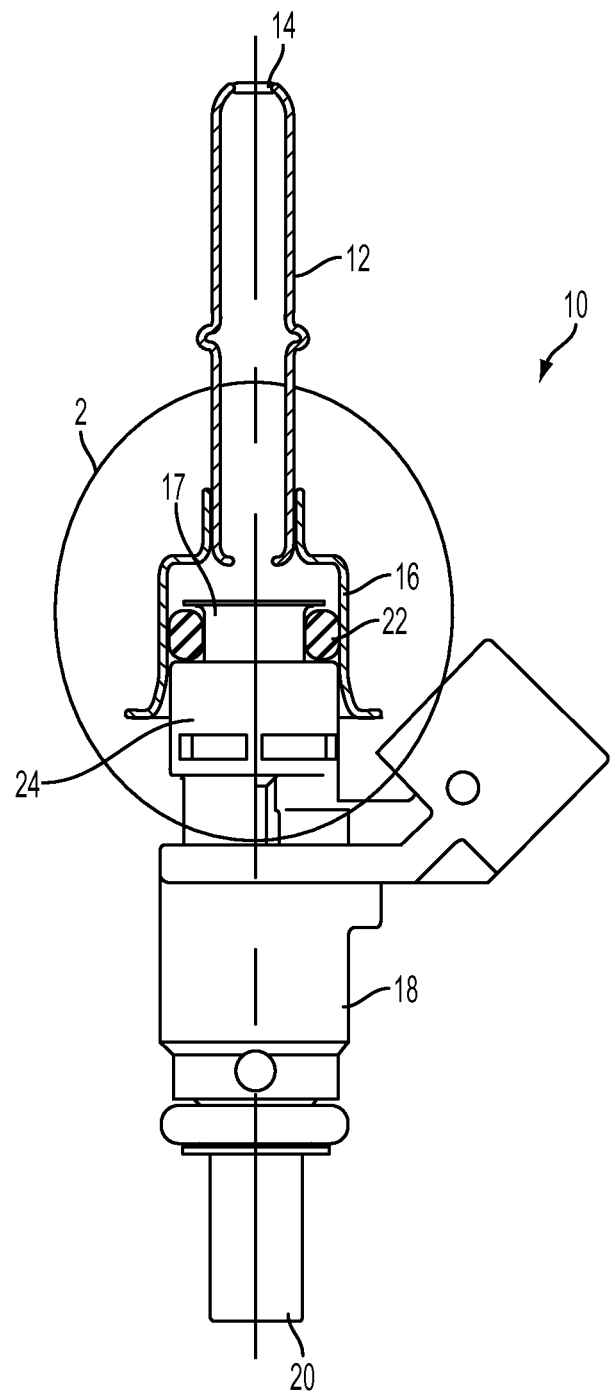
FIG. 1 side view of conventional urea injector having a conventional O-ring seal between an inlet cup and inlet tube.
Figure 2:
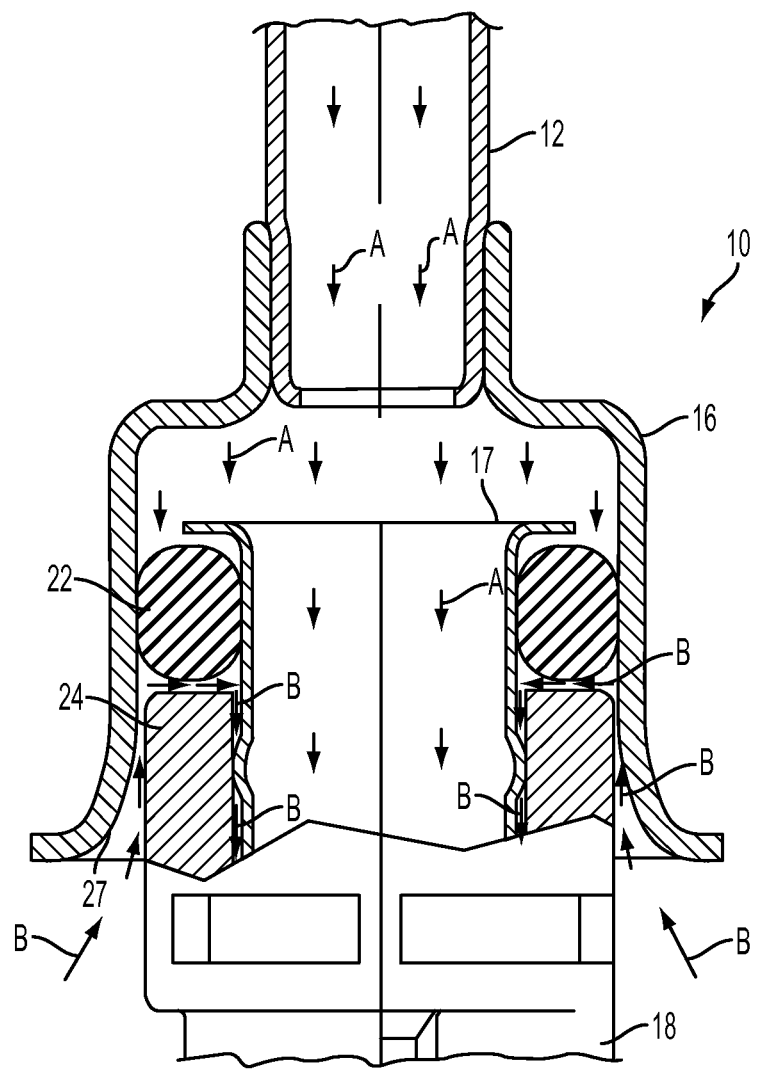
FIG. 2 is an enlarged view of the portion encircled at 2 in FIG. 1.

The injector 10' is similar to the injector 10 of FIG. 1, but has improved sealing. The injector 10' has an inlet connector 12 at an inlet of the injector and an inlet cup 16 coupled to the inlet connector 12. An inlet tube 17, receiving urea solution from the inlet, is coupled to a body 24 of the injector 10' and delivers the urea solution to the solenoid 18 that is housed in the body 24. The electrically operated solenoid 18 controls the amount of urea solution delivered from an outlet 20 of the injector and into the exhaust gas flow path 11 of a vehicle in a dosing application. An open end 27 of the inlet cup 16 covers an opened end 29 of the inlet tube 17 and covers a portion of the body 24 of the injector 10'.

Figure 6:
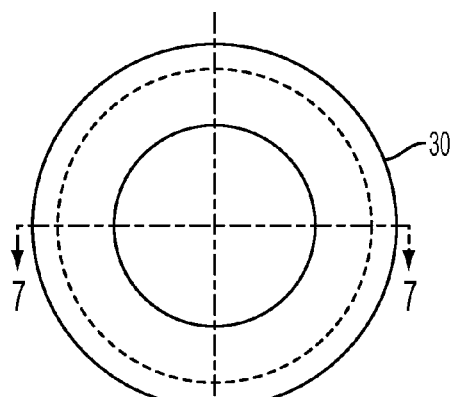
FIG. 6 is a top view of a seal member of the sealing structure of FIG. 3.
Figure 8:
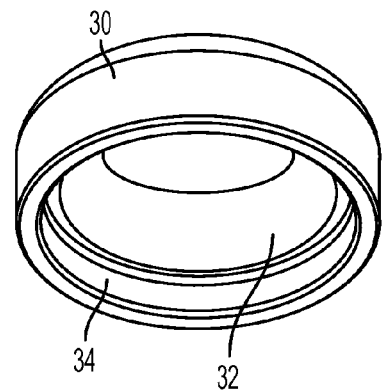
FIG. 8 is a bottom perspective view of the seal member of FIG. 6.
Figure 7:
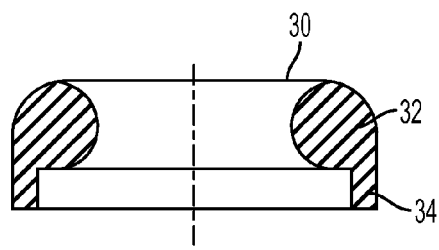
FIG. 7 is a cross-sectional view of the seal member taken along the line 7-7 in FIG. 6.

In the embodiment of FIG. 3, sealing structure, generally indicated at 26, prevents the intrusion of liquid B between the inlet cup 16, the body 24 and inlet tube 17 of the injector and thus prevents liquid from entering an interior 28 of the injector 10' via the open end 27 of the inlet cup 16. The sealing structure 26 comprises an annular seal member 30 preferably of compressible elastomeric material including a primary seal 32 having a preferably toroid shape, and an integral secondary seal 34, extending axially from a periphery of the primary seal 32 to define a flap. FIGS. 6-8 show various views of the sealing structure 30. The primary seal 32 is compressed between the inner periphery of the inlet cup 16 and the outer periphery of the inlet tube 17.

Figure 4:
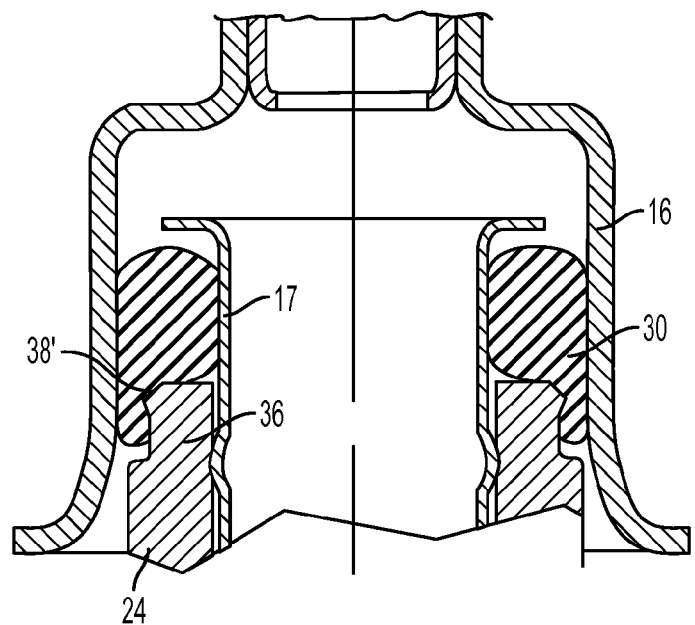
FIG. 4 is a view of the sealing structure of an embodiment wherein the end portion of the body has a generally triangular shaped surface feature.
Figure 5:
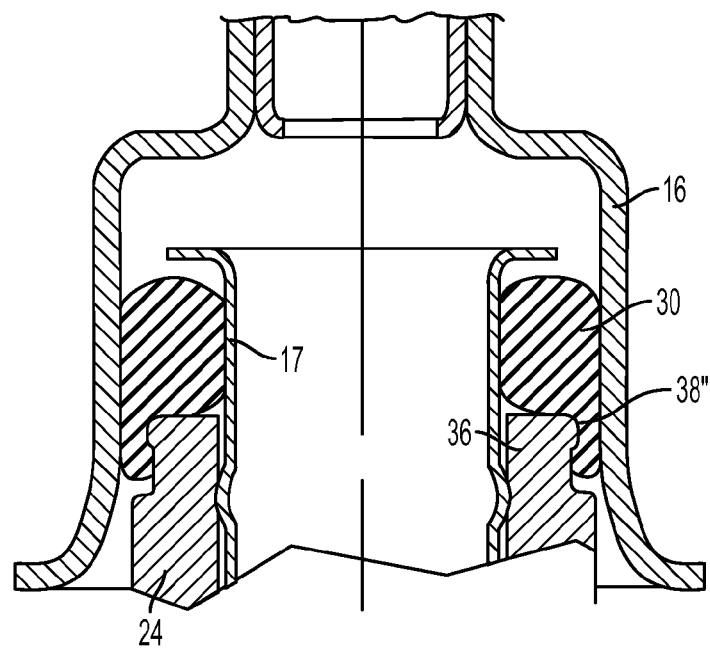
FIG. 5 is a view of the sealing structure of another embodiment wherein the end portion of the body has a generally rectangular shaped surface feature.

The sealing structure 26 also includes an end portion 36 of the body 24 which engages the secondary seal 34. The end portion 36 includes a surface feature 38 that compresses a portion of the secondary seal 34 against the inlet cup 16. A cut-out 40 in the end portion 36, defined by reducing the diameter of the end portion 36, receives an expansion portion 42 of the secondary seal 34. In the embodiment of FIG. 3, the surface feature 38 is preferably a protrusion such as a raised, rounded corner. Alternatively, as shown in FIG. 4, the protrusion or surface feature 38' can be a generally triangular shaped surface on the body 24, or as shown in FIG. 5, the protrusion or surface feature 38" can be a generally rectangular shaped surface on the body 24. Other shaped surfaces that can compress the secondary seal 34 may be employed as the surface feature on the body 24. Alternatively, it can be appreciated that the surface feature 38 can be provided on the inlet cup 16 to compress a portion of the secondary seal 34 against the body 24.

The primary seal 32 serves the primary purpose of sealing the inlet cup 16 to the inlet tube 17, while the secondary seal 34 forms another seal that seals against external liquid ingress into an interior of the injector 10'. The secondary seal 32, acting like a flap, is compressed between the inlet cup 16 and the surface feature 38 of the end portion 36 of the injector body 24. The raised surface feature 38 of the end portion 36 applies compression to the elastomeric seal 34 while allowing expansion or contraction of the components due to differing thermal expansion rates of components and elastomeric swelling.

Figure 9:
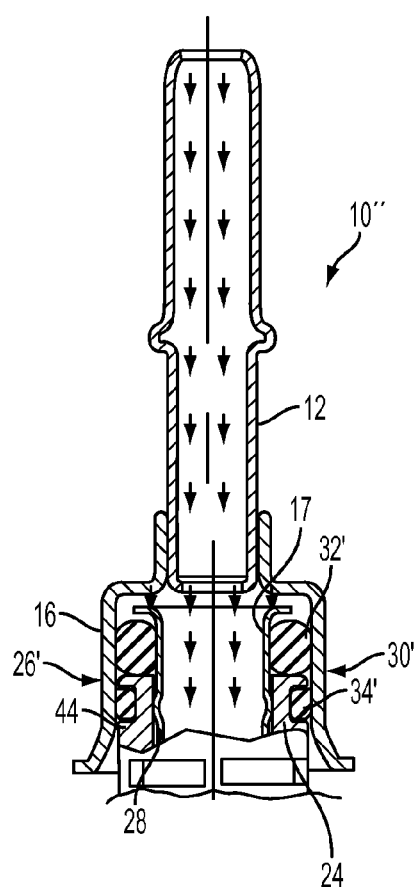
FIG. 9 is a view of sealing structure to prevent the intrusion of liquid between an inlet cup and a body of a urea injector, in accordance with yet another embodiment, wherein the seal member of the sealing structure includes separate primary and secondary seals.

With reference to FIG. 9, instead of providing the unitary seal member 30 of FIG. 3, the sealing structure 26' includes a seal member 30' having a primary seal 32' and a separate, secondary seal 34'. The primary seal 32' is compressed between the inner periphery of the inlet cup 16 and outer periphery of the inlet tube 17. The sealing structure 26' also includes an end portion 36' of the body 24 which has a surface feature in the form of an O-ring groove 44 that receives the secondary seal 34'. In this embodiment, the inlet cup 16 is lowered so that the secondary seal 34' is captured in the groove 44 between the inlet cup 16 and the body 24, preventing liquid from entering the interior 28 of the injector.

Figure 10:
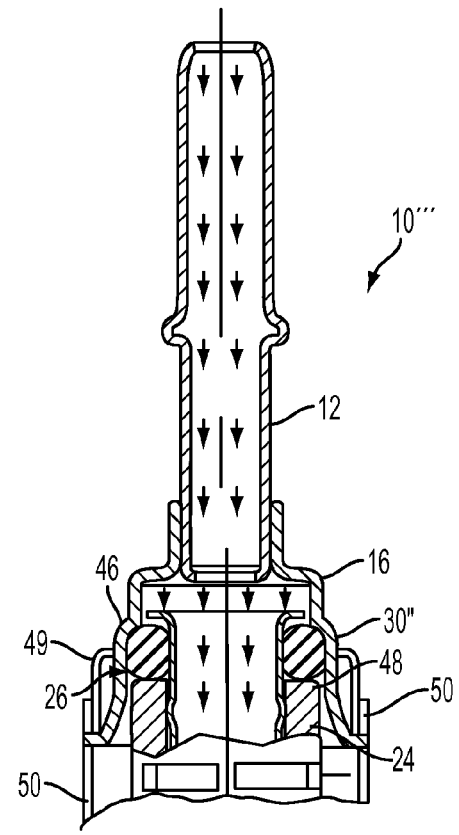
FIG. 10 is a view of sealing structure to prevent the intrusion of liquid between an inlet cup and a body of a urea injector, in accordance with another embodiment, wherein the inlet cup applies an axial force on a seal member to compress the seal member against the injector body.

With reference to FIG. 10, another embodiment of the sealing structure 26" is shown.

The sealing structure 26" includes a single seal 30", preferably in the form of a conventional elastomeric O-ring, compressed between the inlet cup 16 and the inlet tube 17 defining a primary seal. The sealing structure 26" also includes an inwardly protruding surface feature 46 of the inlet cup 16 that provides an axial force on the seal 30" to compress the seal 30" against the planar upper surface 48 of body 24, thereby defining the secondary seal that prevents liquid from entering the interior 28 of the injector 10'". In the embodiment, the surface feature 46 is an annular surface defined by a reduced diameter portion of the inlet cup 16. The inlet cup 16 is held down by a retainer 49 that is fixed to a housing 50 of the injector 10'" so as to maintain the axial force on the seal 30". The retainer 49 and housing 50 can be provided in all embodiments of the injector, although they are only shown in FIG. 10.

Although the injector 10' disclosed is for delivering urea solution, the injector of the embodiments can be used to deliver any suitable fluid, while preventing unwanted liquid intrusion into the interior of the injector.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:
1. A fluid injector comprising:
a body associated with an outlet of the injector,
an inlet tube coupled to the body and having an open end for receiving fluid to be injected,
a unitary inlet cup having a passage there-through in fluid communication with the open end of the inlet tube, the inlet CUP having an annular inner periphery defining cup-shaped internal space, with the open end and an outer peripheral portion of the body being received in the internal space, and sealing structure comprising:
- a primary seal providing a seal between the inner periphery of the inlet cup and an outer periphery of the inlet tube,
- a secondary seal between the body and the inner periphery of the inlet cup and constructed and arranged to prevent liquid that is external to the injector from entering an interior of the injector through the open end of the inlet cup, and
- a surface feature on the body or on the inlet cup constructed and arranged to compress a portion of the secondary seal between the inlet cup and the body.

2. The injector of claim 1, wherein the secondary seal is integral with the primary seal so as to define the sealing structure as a unitary member.

3. The injector of claim 2, wherein the primary seal is annular and of generally toroid shape, the secondary seal extending axially from a periphery of the primary seal to define a flap.

4. The injector of claim 3, wherein the surface feature is a protrusion on an end of the body, the end of the body further including a cutout such that as the surface feature compresses the portion of the secondary seal, the cutout is constructed and arranged to receive an expansion portion of the secondary seal.

5. The injector of claim 4, wherein the protrusion is a rounded corner of the body.

6. The injector of claim 4, wherein the protrusion is of a generally triangular shaped surface on the end of the body, or is of a generally rectangular shaped surface on the end of the body.

7. The injector of claim 1, wherein each of the primary and secondary seals is composed of elastomeric material.

8. The injector of claim 1, wherein the primary seal is separate from the secondary seal, and wherein the surface feature includes an O-ring groove in the body, the secondary seal being disposed in the O-ring groove and compressed between the inlet cup and the body.

9. The injector of claim 2, wherein the surface feature is on the inlet cup and provides a generally axial force on the primary seal to compress the secondary seal between the body and the inlet cup.

10. The injector of claim 9, wherein the surface feature is an annular surface defined by a reduced diameter portion of the inlet cup.

11. The injector of claim 10, further comprising a retainer associated with the inlet cup to maintain the axial force provided by the inlet cup.

12. The injector of claim 1 coupled to an exhaust gas flow path of a vehicle, the injector being constructed and arranged to inject urea solution into the exhaust gas flow path.

13. A method of preventing liquid, external to an injector, from entering the injector, the injector comprising a body associated with an outlet of the injector, an inlet tube coupled to the body and having an open end for receiving fluid to be injected, and a unitary inlet cup having a passage therethrough in fluid communication with the open end of the inlet tube, the inlet CUP having an inner periphery defining a cup-shaped internal space, with the open end and a portion of the body being received in the internal space, the method comprising the steps of:
- providing a primary seal between the inner periphery of the inlet cup and an outer periphery of the inlet tube,
- providing a secondary seal between the body and the inner periphery of the inlet cup, and
- compressing at least a portion of the secondary seal between the body and the inlet cup to prevent the external liquid from entering an interior of the injector through the open end of the inlet cup.

14. The method of claim 13, wherein the compressing step includes providing a surface feature on the body or on the inlet cup to compress the portion of the secondary seal between the inlet cup and the body.

15. The method of claim 14, wherein the surface feature is a protrusion on an end of the body, the end of the body further including a cutout such that as the surface feature compresses the portion of the secondary seal, an expansion portion of the secondary seal is received in the cutout.

16. The method of claim 14, wherein the surface feature is a rounded corner of the body.

17. The method of claim 14, wherein the surface feature is a generally triangular shaped surface on the end of the body.

18. The method of claim 14, wherein the surface feature is a generally rectangular shaped surface on the end of the body.

19. The method of claim 14, wherein the surface feature is an annular surface defined by a reduced diameter portion of the inlet cup.

* * * * *